United States Patent
Chandler et al.

[11] Patent Number: 5,419,145
[45] Date of Patent: May 30, 1995

[54] CHEMICAL ENERGY STORAGE SYSTEM
[75] Inventors: Travis Chandler; Uwe Rockenfeller, both of Boulder City, Nev.
[73] Assignee: Rocky Research, Boulder City, Nev.
[21] Appl. No.: 180,712
[22] Filed: Jan. 13, 1994
[51] Int. Cl.$^6$ .................................................. C09K 5/04
[52] U.S. Cl. ........................................ 62/112; 62/476; 252/69
[58] Field of Search ............... 62/101, 102, 112, 267, 62/335, 476; 252/67, 69

[56] References Cited

U.S. PATENT DOCUMENTS

| | | | |
|---|---|---|---|
| 3,949,566 | 4/1976 | Hopkins | 62/475 |
| 4,341,084 | 7/1982 | Rojey et al. | 62/101 |
| 4,455,247 | 6/1984 | Nakayama et al. | 252/67 |
| 4,475,353 | 10/1984 | Lazare | 62/101 |
| 4,557,850 | 12/1985 | Ando et al. | 252/68 |
| 4,614,605 | 9/1986 | Erickson | 252/69 |
| 4,823,864 | 4/1989 | Rockenfeller | 165/104.12 |
| 4,966,007 | 10/1990 | Osborne | 62/101 |
| 5,033,274 | 7/1991 | Erickson | 62/476 |
| 5,038,574 | 8/1991 | Osborne | 62/101 |
| 5,186,009 | 2/1993 | Rockenfeller | 62/112 |

Primary Examiner—Henry A. Bennett
Assistant Examiner—William C. Doerrler
Attorney, Agent, or Firm—Jerry R. Seiler

[57] ABSTRACT

The rate of water vapor sorption of an absorption cycle cooling and/or heating system using an aqueous alkali metal hydroxide solution as the working fluid is increased by adding at least 2 parts per million of a primary, secondary or tertiary aliphatic, cycloaliphatic or aromatic amine to the fluid.

116 Claims, 5 Drawing Sheets

DUHRING PLOT FOR 47% NaOH–53% KOH–H$_2$O SOLUTION

FIG. 2 DUHRING PLOT FOR 47% NaOH–53% KOH–H₂O SOLUTION

FIG. 3 DUHRING PLOT FOR 49% NaOH–51% KOH–H₂O SOLUTION

FIG. 4  DUHRING PLOT FOR 53% NaOH–47% KOH–H₂O SOLUTION

FIG. 5

CHEMICAL ENERGY STORAGE SYSTEM

BACKGROUND OF THE INVENTION

In U.S. Pat. No. 4,823,864 there is disclosed a system for storing chemical energy utilizing aqueous absorption compositions from which water is alternately evaporated and absorbed at selected time intervals. Such an absorption system provides for energy storage during off-peak hours, typically at night, when municipal power requirements are reduced. The energy may then be selectively recovered at peak hours to produce refrigeration when the need is greatest and the demand and cost of electrical energy is highest. These systems obviously offer advantages over commonly used vapor compression refrigeration systems which do not utilize such thermal storage.

In the aforesaid patent, a number of aqueous salt systems are disclosed including alkali metal hydroxide solutions which have been found to be highly effective and efficient. Of particular interest are the aqueous solutions of sodium hydroxide, potassium hydroxide and mixtures thereof. These solutions are preferred over lithium bromide absorption solutions which are less attractive because of relatively high costs and limited energy storage capacities. The aqueous NaOH and KOH absorbent solutions offer substantial advantages over conventional ice storage systems because of their adaptability to operating at temperatures different from 32° F., in particular in the range of 36° F. to 50° F. during the charging process with simultaneous use of heat, often available as reject heat, in the range of 80° F. to 135° F. which allows for the use of almost all vapor compression equipment as well as absorption equipment for charging the system. Moreover, such a system does not require the typical suction temperatures of 12° F. to 22° F. needed for effective ice storage and which are less efficiently achieved with vapor compression and absorption equipment. However, such advantages are practical only if adequate storage density can be obtained.

For such storage density, a heat and mass transfer additive is needed which prevents excessive subcooling in the absorption and/or desorption process while providing high accessible and usable concentration spreads between the concentrated and diluted solutions and at the same time provides high power densities thus reducing heat transfer surface requirements for a given load. However, the known heat and mass transfer additives normally used with aqueous lithium bromide absorption solutions, specifically, aliphatic alcohols such as 2-ethyl hexanol and 1-octanol, form solid precipitates when contacted with the alkali metal hydroxide solutions, and are thus unsatisfactory.

SUMMARY OF THE INVENTION

According to the present invention it has been found that primary, secondary and tertiary aliphatic and aromatic amines are highly effective heat and mass transfer additives used in aqueous alkali metal hydroxide solutions. The use of such amines increases the rate of water vapor absorption by the aqueous alkali metal hydroxide fluids thereby achieving important advantages and improvements in system performance. The improvements include absorber power load increases and improvements in the change of absorber fluid concentrations even in a first or single pass across the absorber heat exchanger. Further improvements include increase in overall heat transfer coefficients and sorption fluid side film heat transfer coefficients. The advantage of such improved absorption fluid performance allows for reduction of sorber heat exchange surface areas needed to satisfy a given load. These and other improvements and advantages will be discussed in the following detailed description.

DETAILED DESCRIPTION OF THE INVENTION

The specific improved aqueous absorption solutions used in the systems of the present invention are solutions of sodium hydroxide, potassium hydroxide or mixtures thereof. Preferred compositions are those utilizing a mixture of the two hydroxides, and preferably those in which the total concentrations of the hydroxide is between about 30% and about 80%, by weight. According to the invention, it has been found that optimum energy storage potentials are realized when sodium hydroxide is present between about 35% and about 75%, by weight, of the combined sodium hydroxide and potassium hydroxide weight. The amount of sodium hydroxide present in the salt mixture for systems at crystallization temperatures above 30° C. is 50% or above, whereas for temperatures below 30° C., the preferred amount of sodium hydroxide is at or below 50% of the salt mixture. The most preferred amount of sodium hydroxide is between 40% and 55% of the combined weight of sodium hydroxide and potassium hydroxide for crystallization temperatures below 30° C. The capacities of aqueous solutions of salts within the above range for absorbing water vapor are illustrated in Duhring plots shown in FIGS. 1–4. In addition to the aforesaid sodium and/or potassium hydroxide solutions, relatively small amounts of other alkali metal hydroxides may be added as well. Thus, the solutions may contain up to about 10–15% cesium, rubidium, and/or lithium hydroxide, based on the weight of sodium and/or potassium hydroxides.

The improved heat and mass transfer aqueous absorption solutions of the present invention contain, in addition to the aforesaid sodium hydroxide and/or potassium hydroxide, an effective amount of a heat and mass transfer additive selected from amines, amides, hydrazines, phosphines, phosphine oxides, aldehydes, ketones, ethers, alcohols, thiols, sulfides, sulfoxides, or sulfones. The preferred embodiment of the invention uses a primary, secondary or tertiary aliphatic or aromatic amine. Preferred amines are those that are normally liquids at system operating conditions, for example, for thermal energy storage applications having an absorber temperature of between about 18° C. and up to 100° C. or more. The additives may be liquid over a wider temperature range, both higher and lower, without adversely affecting the operation of the invention. Thus, for example, aniline is a satisfactory additive, with a freezing point of −6° C. and a normal boiling point of 184° C. The amines may contain one amine functional group, or may have multiple amine groups including two, three or more functional groups in the same molecule. Preferred amine additives, according to the invention, are primary aliphatic and aromatic amines, preferably having between six and twelve carbon atoms. Of the former group, most preferred amines include octylamine, nonylamine and decylamine, and their isomers having branched aliphatic groups. Other preferred primary amines include cycloaliphatic or alicyclic amines such as cyclohexylamine and diaminocyclohexane and its different isomers. Other particularly useful and effective amines include secondary aliphatic amines and cycloaliphatic (alicyclic) amines of 6–12 carbon atoms such as substituted piperidines and dialkyl amines and the anilines, including aniline and substituted anilines such as 3, 5-bistrifluoromethylaniline and 2, 3, 4, 5, 6-pentafluoroaniline. From the specific examples, it will be noted that the amino compounds may have one or more amine functional groups in the same molecule. The amine molecule may also include one or more other functional groups such as alcohols, amines, halogens, thiols, ethers, and ketones, provided such functional groups do not cause the amine to form a precipitate or otherwise induce chemical instability in the presence of hydroxide solutions. It is also to be understood that the specific amines disclosed are given by way of example only, and any of the aforesaid amines or combinations thereof within the disclosed groups of amines may be used. The amount of amine additive added to the aqueous sodium hydroxide and/or potassium hydroxide solutions can be used in effective amounts of a few parts per million, by weight, for example, between about 2 and about 200 ppm to 500 ppm, although amounts greatly in excess of this range up to 5000 ppm or more will not adversely affect the system operation. Mixtures of the aforesaid amine additives may also be used.

According to the invention, it has been found that the presence of an amine in the aqueous absorption fluid containing either of the aforesaid alkali metal hydroxides or mixtures thereof is substantially improved in performance as an absorption working fluid composition. Specifically, the performance of the system improves in the following manner: water cooling temperature change in the absorber, for a constant water flow rate, rises significantly; the absorber power load increases proportional to the change in water cooling temperature; the steady state vapor pressure drops, and if brought back to its initial value to achieve a constant evaporator temperature, the change in concentration of the absorber fluid increases significantly even on a single pass across the absorber; the absorber solution subcooling, i.e., the difference between the maximum temperature at equilibrium (saturation) and the actual solution temperature, is decreased by several degrees; the absorber solution-heat exchanger tube interface comprises a highly agitated turbulent film as compared to a generally laminar flow pattern without presence of the additive; overall heat transfer coefficients and sorption fluid film heat transfer coefficients are increased.

As previously noted, the improvement of systems incorporating the amine heat and mass transfer additives in the alkali metal aqueous absorption solutions of the invention include a number of different types of systems in which such absorption solutions are typically used. Such equipment includes absorption chillers and refrigeration systems and apparatus such as disclosed in U.S. Pat. Nos. 4,966,007, 5,038,574 and 5,186,009, thermal energy storage systems such as disclosed in U.S. Pat. No. 4,823,864, as well as multiple effect absorption refrigeration systems, for example, the triple effect system disclosed in U.S. patent application Ser. No. 07/800,636, filed Nov. 27, 1991. The description of those patents and application including the apparatus and systems disclosed therein are incorporated herein by reference.

Figure 1:
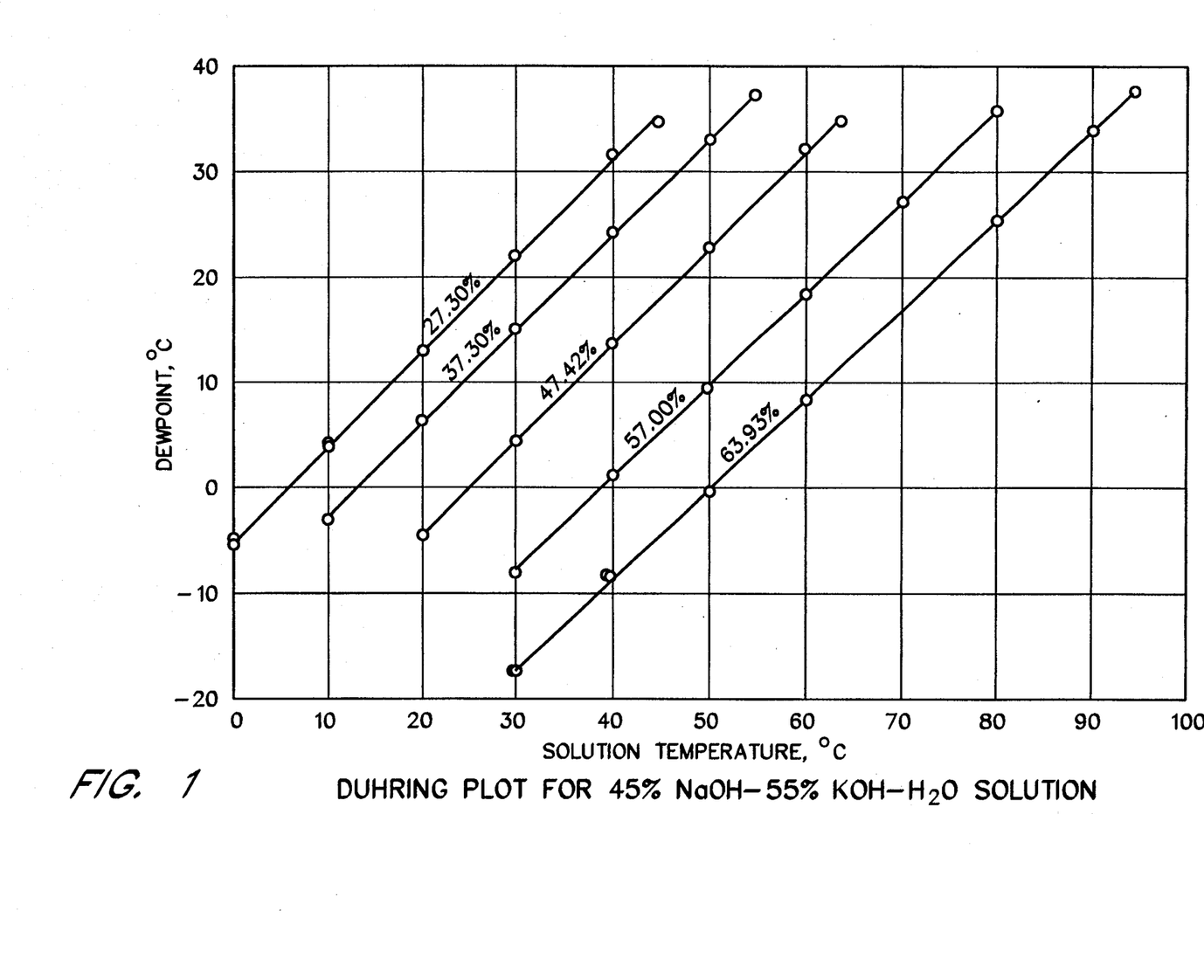
FIGS. 1–4 are During plots showing the capacity of ternary fluids of the invention for absorbing refrigerant vapor.
Figure 2:
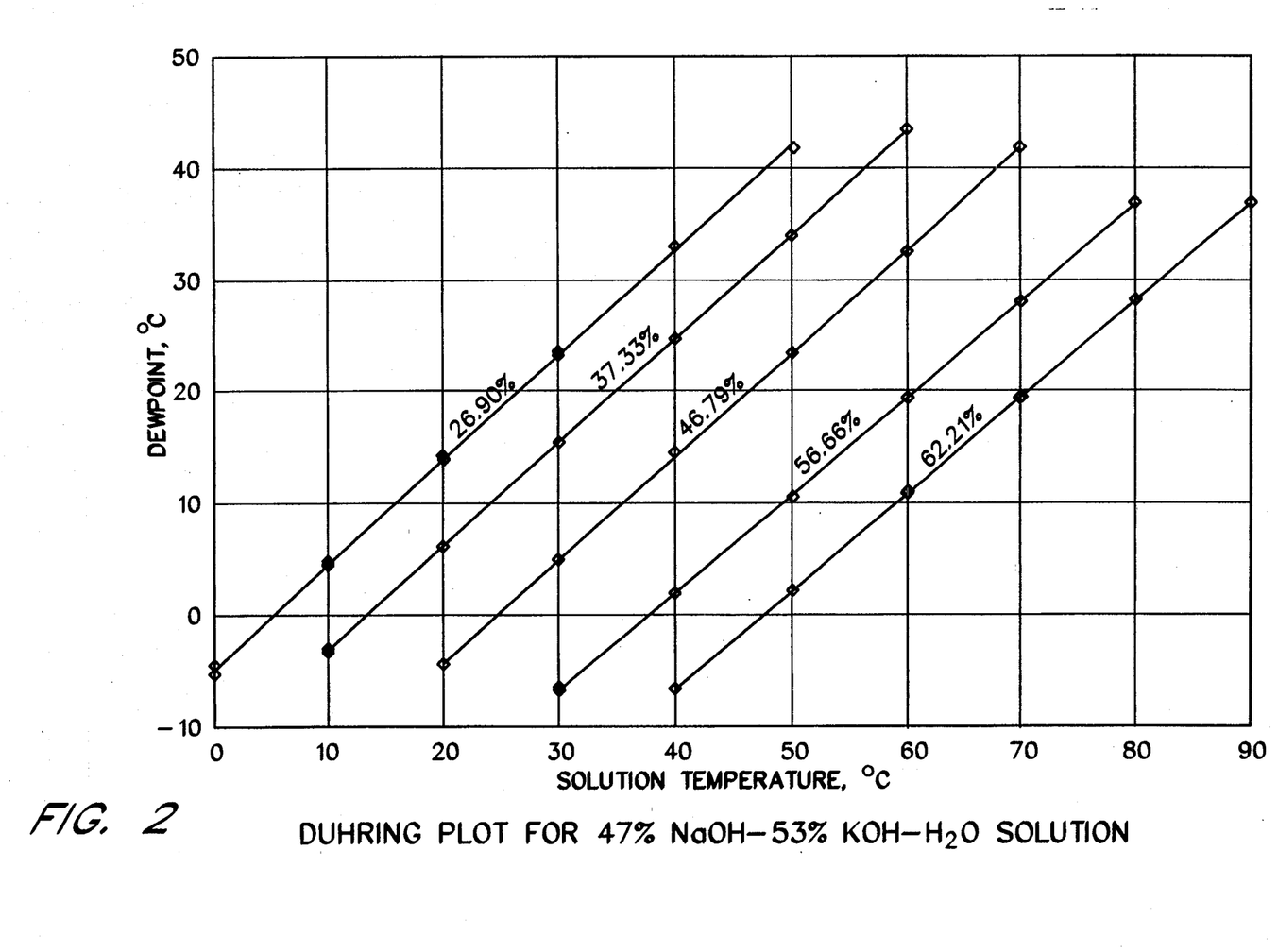
Figure 3:
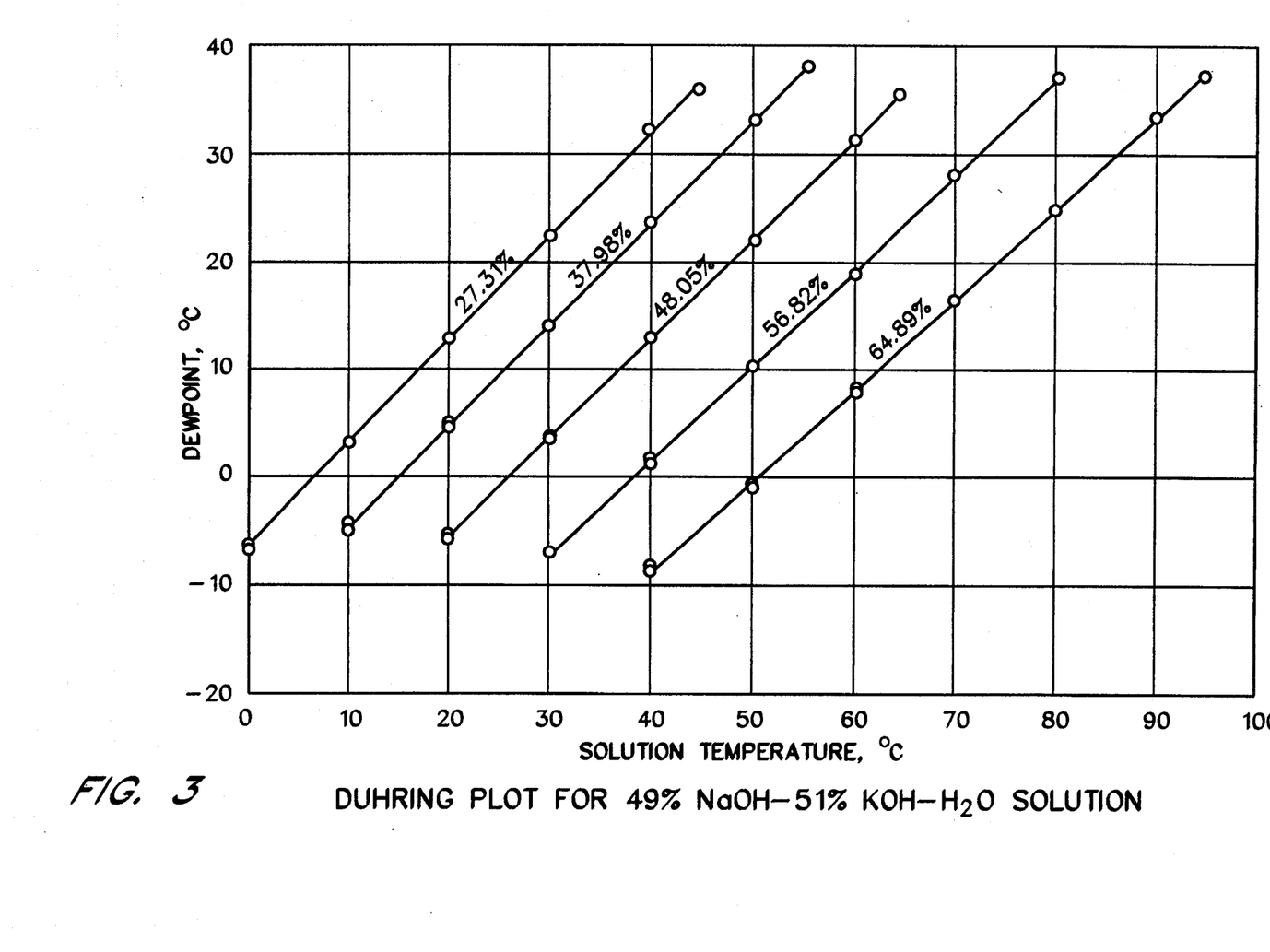
Figure 4:
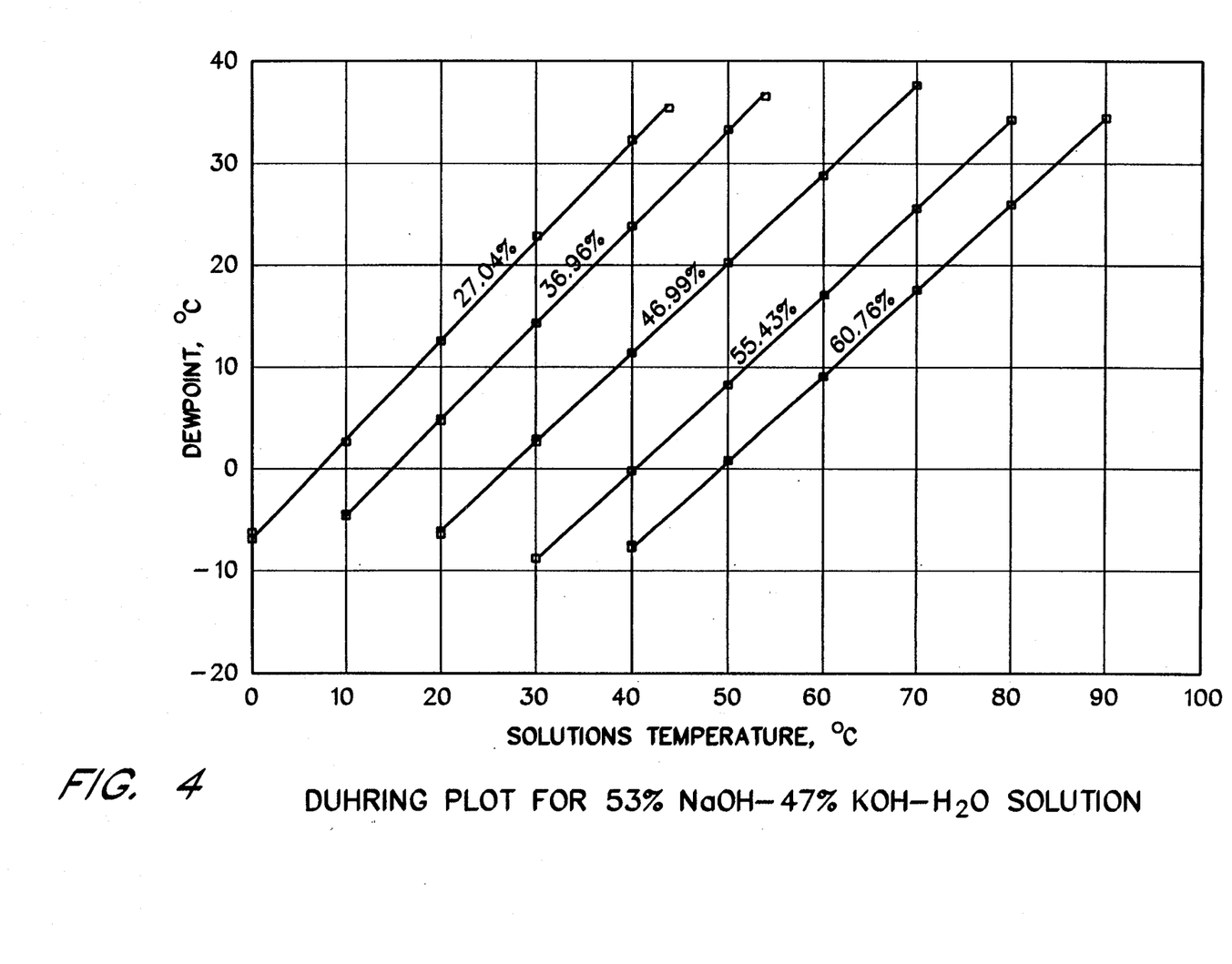
Figure 5:
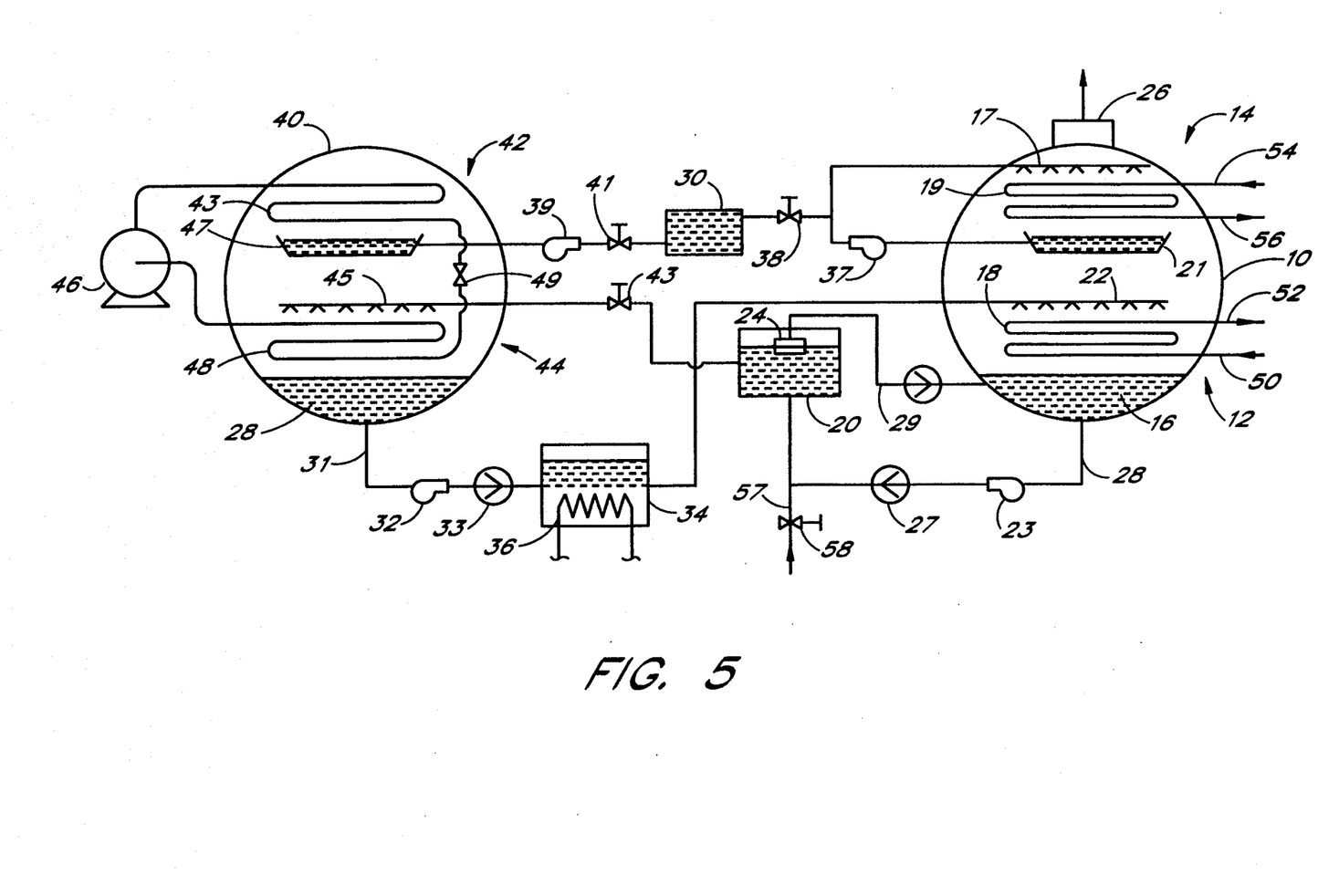
FIG. 5 is a schematic view of a typical aqueous absorption apparatus.

An apparatus of the type disclosed in the aforesaid U.S. Pat. Nos. 5,038,574 and 4,823,864 is illustrated in FIG. 5 for the purpose of describing the functioning of the system using such an improved aqueous absorption solution. In addition, the apparatus shown in the accompanying drawing also shows other improvements and components especially useful in such a system. Referring now to the apparatus illustrated schematically in FIG. 5, there are shown two reaction vessels, first vessel 10 comprising the absorber vessel and a second vessel 40 being the concentrator vessel. Absorber vessel 10 includes an absorber section 12 and an evaporator section 14 enclosed in the common open space of the vessel. The absorber section 12 contains the aqueous absorption solution received from the concentrator vessel 40 and which becomes diluted by absorbing water vapor present in the vessel. The absorber section also includes heat exchange coil 18 through which cooling water from a cooling tower or other heat rejection device or system is directed via inlet and outlet conduits 50 and 52 for cooling the concentrated aqueous solution 16 which becomes heated during dilution as it absorbs water vapor in absorber vessel 10. A spray header 22 or similar distribution device sprays aqueous solution over the heat exchange coil 18 during the absorption phase. The evaporator section 14 of absorber vessel 10 includes a collector pan or similar container located below heat exchange coil 19 and spray header 17. Heat exchange coil 19 is operably connected to cooling load inlet 54 and outlet 56 through which a refrigerant to be cooled is directed from a cooling or refrigeration load, for example, a chiller or refrigeration system evaporator coil or used for any desired cooling, directly or indirectly, for cooling any gas, liquid, or solid compositions, components or materials, or used in processes or manufacturing operations and the like. Cold water originating from the condenser section 42 of concentrator vessel 40 by passing over evaporator coil 43 during the system charging phase is sprayed over heat exchange coil 19 by spray header 17. The water is directed to the spray header via a water storage tank 30, and during the absorption-discharge phase of operation is also circulated from collector pan 21 by pump 37 for continually cooling the refrigerant in heat exchange coil 19.

Concentrator vessel 40 includes a condenser section 42 and a generator section 44. The generator section contains aqueous absorption solution 28 and a condenser coil 48. Dilute aqueous absorption solution is directed to the generator section 44 from the absorber section 12 of absorber vessel 10 via dilute solution storage tank 20. The spray header 45 distributes the dilute aqueous absorption solution over the hot heat exchange coil 48, vaporizing water therefrom which then condenses in condenser section 42 on evaporator coil 43 and is collected in collector pan 47. The condensed and collected water is pumped via pump 39 and valve 41 into storage tank 30.

The system also includes a concentrated solution storage tank 34 into which concentrated solution 28 from generator section 44 is directed via pipe 31, pump 32, and one-way valve 33. The concentrated solution storage tank preferably includes a heater 36 for selectively increasing the temperature of the concentrated solution in the storage tank to prevent crystallization, especially desirable when the system is not used or installed in a heated environment. The system also preferably includes a purge device assembly 26 operably connected to or cooperating with absorber vessel 10 for purging non-condensibles. Because of large volumes of water vapor used and circulated in the absorber 10 during discharge (absorption), it may be desired to purge at more than one location in the absorber. Such purge assemblies and operation are known in the art, for example, as disclosed in U.S. Pat. No. 3,949,566, the relevant portions incorporated herein by reference. It will be understood that the assembly illustrated in the drawings herein are schematic and representational only.

In yet another preferred embodiment, the system of the invention includes a skimmer device 24 for separating additive which collects in the solution storage tank 20. As previously disclosed, the preferred additives of the invention are insoluble or only slightly soluble in the aqueous absorption solutions. Because of this, the additive, if used at concentrations above solubility, will become concentrated in a storage vessel and float on top of the aqueous solution therein. The skimmer device 24 shown in dilute solution storage tank 20 includes means for directing the skimmed or separated additive from the solution storage tank to the absorber vessel 10. For this purpose conduit 29 leading to the absorber vessel is illustrated whereby the recovered heat and mass transfer additive is directed back to the solution 16 in the absorption section of vessel 10 where it functions to achieve the improvements of the present invention. An additive skimmer may also be provided in the concentrated solution storage tank.

In order to improve and optimize the energy density of the system, it is desirable to optimize or maximize the total mass transfer for any given fluid, and also the temperature spread between the respective temperatures of heat and cold supplied simultaneously during the charging phase previously described. For this purpose, waste heat such as hot gases of combustion, condenser heat, and/or superheat from vapor compression or sorption cycle apparatus may be used for vaporizing water from the aqueous solution in the generator section of the concentrator vessel 40. In a preferred embodiment, a vapor compressor 46 driven by an electric motor (not shown) is used to supply superheated refrigerant to condenser coil 48. Such superheated refrigerant can be exploited to provide heat in a desuperheater at higher temperatures than the condenser, for example, up to 160° C. or more in contrast to lower condenser temperatures as understood in the art. The condensed refrigerant in the coil is then vaporized as it passes through expansion valve 49 to evaporator coil 43 where it provides cooling for condensing and chilling the vaporized water from generator section 44. A condenser (not shown) may also be used for providing additional heat for operating the generator section of the concentrator vessel. Exhaust heat may also be used to provide heat to the generator section from a suitable source such as from burning combustible gases or from gas turbines, engines, and the like, known to those skilled in the art. Thus, exhaust heat from the combustion system of a heat activated chiller or higher stage or higher temperature condenser heat may be used for providing such heating. Additional cooling for condensing vaporized water in condenser section 42 for further increasing the charging phase temperature spread between the condenser section and the generator section 44 may also be used, such as cooling from a supplemental evaporator, an outside cold source, or the like. Heat and cooling may also be simultaneously supplied from an air conditioning system or heat pump for charging the above-described system of the invention.

The system may include a dilution circuit for injecting water into the aqueous absorption solution for preventing crystallization. For this purpose, conduit 57 and selectively operable valve 58 are shown for the purpose of injecting water into the dilute solution circuit associated with absorber vessel 10.

The system may also include control means or components for adjusting system operating conditions in response to detected ambient temperatures and monitoring the solutions within the system including components for inputting solution equilibrium properties, for example, Duhring plot and crystallization points. Such a control system allows for operating the system at higher salt concentrations and provides higher storage densities if suitable weather conditions permit.

To illustrate the improvement of system performance by using the heat and mass transfer additives of the present invention, the following examples are provided. In Table I, amine additives within the scope of the present invention are shown by way of example. The results given are for a constant set of operating conditions and include: initial cooling water (reject) temperature of 30° C., a cooling water flow rate of 4.4 gal/min, a system water vapor pressure of 10 mbar (7° C. evaporator temperature), initial aqueous solution concentration of 52% NaOH, initial solution flow rate of 300 ml/min, and initial solution temperature of 50° C. entering the absorber using a special bench test absorption machine. The water and solution temperatures, flow rates and vapor pressures are taken from monitor readings during operation. The concentrations are determined from fluid samples taken from the machine.

The results are based on heat transfer equations well known to practitioners of the art. The absorber load dQ/dt is calculated from the water temperature, heat capacity of water, and water flow rates, $$\frac{dQ}{dt} = (T_{H2O,out} - T_{H2O,in}) * C_p(H_2O) * \frac{dm_{H2O}}{dt} \qquad (1)$$

For the heat transfer coefficients, the temperature change is treated as the log mean differential temperature, where $$LMDT = \frac{(T_{Sol,in} - T_{H2O,out}) - (T_{Sol,out} - T_{H2O,in})}{\ln(T_{Sol,in} - T_{H2O,out}) - \ln(T_{Sol,out} - T_{H2O,in})} \qquad (2)$$

The overall heat transfer coefficients $U_o$ are $$U_o = \frac{\frac{dQ}{dt}}{LMDT * (\text{tube area})} \qquad (3)$$

The outside film heat transfer coefficient $h_o$ is calculated from $$h_o = \frac{1}{\frac{1}{U_o} - R_{i,m}} \qquad (4)$$

where $R_{i,m}$ is the thermal resistivity of the inside cooling water and copper metal tube wall. Solution subcooling is the temperature difference ($\Delta T$) between the actual solution temperature leaving the absorber and the calculated absorber solution equilibrium temperature at the measured concentration and system vapor pressure values. Thus, greater subcooling temperature values reflect greater system inefficiency.

TABLE I

| Additive | Conc. ppm | Water Temp Change, °C. | Fluid Conc. Change, % | $U_o$ (W/m²K) | $h_o$ (W/m²K) | Absorber Load (w) | Subcooling °C. |
|---|---|---|---|---|---|---|---|
| None | — | 0.76 | 0.78 | 1064 | 1236 | 899 | 8.84 |
| nonylamine | 20 | 0.94 | 1.40 | 1113 | 1361 | 1105 | 5.95 |
|  | 500 | 1.18 | 2.39 | 1407 | 1826 | 1346 | 5.39 |
|  | 560 | 1.19 | 2.11 | 1469 | 1935 | 1395 | 5.03 |
|  | 960 | 1.28 | 2.22 | 1646 | 2252 | 1503 | 5.25 |
|  | 1160 | 1.34 | 2.45 | 1712 | 2375 | 1575 | 5.06 |
|  | 1360 | 1.29 | 2.13 | 1715 | 2380 | 1514 | 6.47 |
| 2-ethylhexylamine | 20 | 1.03 | 1.62 | 1263 | 1584 | 1202 | 6.25 |
|  | 100 | 1.11 | 1.70 | 1329 | 1690 | 1298 | 5.73 |
|  | 200 | 1.19 | 1.97 | 1456 | 1901 | 1395 | 5.42 |
|  | 400 | 1.24 | 1.89 | 1475 | 1932 | 1451 | 6.02 |
| 3,5-bis-trifluoromethylaniline | 20 | 1.34 | 2.51 | 1554 | 2067 | 1577 | 4.25 |
|  | 40 | 1.21 | 2.03 | 1405 | 1813 | 1445 | 4.74 |
|  | 100 | 1.51 | 2.68 | 1765 | 2457 | 1774 | 3.99 |
|  | 200 | 1.45 | 2.64 | 1736 | 2402 | 1701 | 4.85 |
| 2,3,4,5,6-pentafluoroaniline | 40 | 0.67 | 0.91 | 828 | 957 | 781 | 7.95 |
|  | 100 | 0.78 | 1.00 | 1036 | 1243 | 921 | 8.26 |
|  | 200 | 0.84 | 1.10 | 1106 | 1344 | 990 | 8.04 |
|  | 400 | 0.95 | 1.40 | 1256 | 1572 | 1113 | 8.16 |
| 1,2-diaminocylclohexane | 20 | 1.66 | 3.08 | 2116 | 3195 | 1952 | 4.33 |
|  | 50 | 1.65 | 3.15 | 2077 | 3106 | 1938 | 4.27 |
|  | 100 | 1.46 | 2.58 | 2115 | 3197 | 1715 | 7.23 |
|  | 200 | 1.65 | 3.05 | 2029 | 3002 | 1933 | 4.22 |
| 2-methyl-1,5-diaminopentane | 10 | 1.26 | 2.42 | 1589 | 2135 | 1474 | 5.64 |
|  | 20 | 1.21 | 2.08 | 1538 | 2041 | 1421 | 6.53 |
|  | 50 | 1.34 | 1.48 | 1658 | 2294 | 1572 | 6.38 |
|  | 100 | 1.52 | 1.48 | 1645 | 2231 | 1779 | 4.07 |
|  | 200 | 1.69 | 1.34 | 1934 | 2808 | 1979 | 4.92 |
|  | 400 | 1.40 | 1.07 | 1685 | 2333 | 1644 | 7.22 |
| 2,6-dimethylhexylamine | 20 | 0.79 | 1.13 | 987 | 1173 | 932 | 7.08 |
|  | 50 | 0.82 | 1.24 | 1044 | 1255 | 960 | 7.54 |
|  | 200 | 0.87 | 1.16 | 1117 | 1366 | 1018 | 7.56 |
|  | 400 | 0.96 | 1.44 | 1304 | 1649 | 1133 | 7.89 |
| decylamine | 20 | 1.39 | 2.43 | 1698 | 2340 | 1637 | 4.42 |
|  | 50 | 1.55 | 2.83 | 1765 | 2458 | 1815 | 3.46 |
|  | 100 | 1.40 | 2.47 | 1562 | 2084 | 1644 | 3.93 |
| dipentylamine | 50 | 1.10 | 1.83 | 1271 | 1598 | 1290 | 4.85 |
|  | 200 | 1.03 | 1.71 | 1222 | 1519 | 1204 | 5.56 |
|  | 1000 | 0.76 | 0.94 | 935 | 1100 | 893 | 7.08 |

From the test results shown in the examples in Table I, utilizing representative examples of amines according to the invention, the improvements of the operating condition performance, taken from actual measurements of the laboratory bench test system as well as calculated values for overall heat transfer coefficients ($U_o$) and fluid film heat transfer coefficients ($h_o$) are shown. Accordingly, significant improvements in cooling water temperature change in the absorber for a constant water flow rate are shown, as are the changes in the concentration of the absorption fluids as they make a single pass across the limited absorber surface. Additionally, the absorber power load increases are shown as are the significant decreases in solution subcooling at the operating conditions. Calculated values of heat transfer coefficient ($U_o$) and film heat transfer coefficients ($h_o$) are also increased.

To further illustrate improvements utilizing the heat and mass transfer additives of the present invention, the operating conditions of the system were changed over a series of runs. Specifically, system water vapor pressures were varied to give different evaporator temperatures, shown as Dew points, different absorber solution flow rates, and different cooling water temperatures shown as "Tube" temperatures. The results are shown in the following Table II.

TABLE II

| Dew Pt. (°C.) | Soln. Flow (ml/min) | Tube Temp, °C. | Additive | Conc. ppm | $h_o$ W/m²K | Absorber Load (W) | Subcooling °C. |
|---|---|---|---|---|---|---|---|
| 3.0 | 300 | 30 | — | — | 1461 | 707 | 7.29 |
|  |  |  | nonylamine | 200 | 1947 | 852 | 5.53 |
|  |  |  |  | 300 | 2030 | 923 | 4.96 |
|  |  |  |  | 600 | 1659 | 738 | 6.07 |
|  |  |  |  | 800 | 2395 | 1036 | 5.01 |
| 3.0 | 300 | 35 | — | — | 1877 | 464 | 4.14 |
|  |  |  | nonylamine | 200 | 2439 | 490 | 3.73 |
|  |  |  |  | 300 | 2450 | 488 | 4.13 |
|  |  |  |  | 1000 | 2498 | 558 | 3.33 |
| 5.0 | 300 | 30 | — | — | 1538 | 782 | 9.32 |
|  |  |  | nonylamine | 200 | 1838 | 1065 | 5.20 |
|  |  |  |  | 300 | 2651 | 1318 | 5.27 |
|  |  |  |  | 800 | 2551 | 1338 | 4.69 |
| 5.0 | 300 | 35 | — | — | 1539 | 565 | 5.07 |
|  |  |  | nonylamine | 200 | 2443 | 717 | 3.91 |
|  |  |  |  | 300 | 2081 | 649 | 4.86 |
|  |  |  |  | 1200 | 2769 | 826 | 3.90 |
| 5.0 | 300 | 40 | — | — | 3366 | 323 | 2.81 |
|  |  |  | nonylamine | 1400 | 3962 | 308 | 2.37 |
|  |  |  |  | 1600 | 3574 | 332 | 2.41 |
| 7.0 | 300 | 30 | — | — | 1290 | 901 | 8.85 |
|  |  |  | nonylamine | 20 | 1361 | 1105 | 5.95 |
|  |  |  |  | 500 | 1826 | 1343 | 5.44 |
|  |  |  |  | 560 | 1935 | 1395 | 5.03 |
|  |  |  |  | 760 | 2128 | 1535 | 4.53 |
|  |  |  |  | 960 | 2253 | 1503 | 5.25 |
|  |  |  |  | 1160 | 2375 | 1575 | 5.06 |
| 7.0 | 300 | 30 | 1,2-diaminocy- | 20 | 3195 | 1952 | 4.33 |
|  |  |  |  | 50 | 3106 | 1938 | 4.27 |

TABLE II-continued

| Dew Pt. (°C.) | Soln. Flow (ml/min) | Tube Temp, °C. | Additive | Conc. ppm | $h_o$ W/$m^2$K | Absorber Load (W) | Subcooling °C. |
|---|---|---|---|---|---|---|---|
| | | | clohexane | 100 | 3197 | 1715 | 7.23 |
| | | | | 200 | 3002 | 1933 | 4.22 |
| 7.0 | 200 | 30 | — | — | 954 | 742 | 7.17 |
| | | | 1,2-diaminocyclohexane | 200 | 2796 | 1692 | 4.00 |
| | | | | 250 | 2848 | 1721 | 4.02 |
| 7.0 | 300 | 40 | — | — | 1969 | 446 | 3.74 |
| | | | nonylamine | 1600 | 2851 | 552 | 2.75 |
| 9.0 | 300 | 30 | — | — | 1217 | 1050 | 8.91 |
| | | | nonylamine | 1160 | 1630 | 1414 | 6.04 |
| 9.0 | 300 | 40 | — | — | 1666 | 551 | 4.74 |
| | | | nonylamine | 1700 | 3072 | 828 | 3.28 |
| | | | | 1900 | 2958 | 834 | 3.39 |

From the results shown in the above tables, it will be seen that significant improvements of the operating parameters are achieved by utilizing different concentrations of the additives shown in the examples over those results achieved at the different operating conditions without any heat and mass transfer additive present in the aqueous absorption solution.

As previously described, the aforesaid heat and mass transfer additives are also useful for improving performance of absorption systems containing ternary aqueous solutions of sodium hydroxide and potassium hydroxide. Table III shows the results of examples using aqueous absorbent solutions containing 47% NaOH, 53% KOH, operating at a solution flow rate of 300 ml/min. and a cooling water flow rate of 4.4 gal/min.

sorber tube areas will be substantially greater, for example using rows of tubes, multiple absorbers and/or the absorption solution will pass over the absorber tubing multiple times resulting in greater increases in fluid concentration change. Table III shows that 47% NaOH and 53% KOH ternary mixture can be used at initial total concentrations of at least as high as 60.3%, and is also an efficient absorber of water vapor at initial total concentrations at least as low as 50%. Thus an apparatus of the present invention can operate at and between either of these concentrations, and when operated to obtain the maximum concentration change, it will obtain the highest total thermal storage capacity. In the preferred embodiment of the invention, the concentration change is between 4% and 20%, with changes between 7% and 15% most preferred. The practical limits of concentrations for which operation can be performed can be determined readily from Duhring plots, such concentration changes can be obtained by reducing the rate of solution flow, increasing the absorber heat exchanger surface area, by recycling the fluid of intermediate concentration through the absorber until full discharge has been accomplished, or by a combination of these and other means as is well understood to those skilled in the art.

As previously stated, the value calculated for solution subcooling is one measure of the efficiency of the system for water vapor absorption, with lower subcooling temperatures indicating an improvement. However, under certain conditions, the derived subcooling numbers may be contrary to other direct measurements of water vapor absorption. Thus, in Table III some data

TABLE III

| Water Temp. C. | Press. mbar | Soln. Conc. | Soln. Temp. C. | Conc. Change | Temp. Change | Load W | $U_o$ W/$m^2$K | $h_o$ W/$m^2$K | Subcooling C. |
|---|---|---|---|---|---|---|---|---|---|
| No additive present | | | | | | | | | |
| 30.01 | 8.76 | 50.0% | 42.0 | 0.37% | 0.41 | 477 | 1046 | 1262 | 5.0 |
| 30.03 | 8.77 | 60.2% | 57.9 | 1.74% | 1.09 | 1261 | 866 | 1008 | 13.1 |
| 29.97 | 10.08 | 52.2% | 46.9 | 0.30% | 0.43 | 483 | 892 | 1046 | 11.8 |
| 30.01 | 10.02 | 55.1% | 50.5 | 1.68% | 1.02 | 1153 | 984 | 1174 | 7.1 |
| 30.05 | 10.02 | 59.8% | 60.0 | 2.21% | 1.28 | 1475 | 849 | 984 | 9.4 |
| 35.00 | 8.68 | 52.1% | 43.3 | 0.36% | 0.30 | 343 | 1042 | 1246 | 4.3 |
| 35.01 | 8.70 | 55.1% | 47.8 | 0.69% | 0.55 | 619 | 948 | 1114 | 6.3 |
| 35.02 | 8.74 | 60.3% | 57.3 | 1.36% | 0.88 | 1014 | 921 | 1074 | 12.2 |
| 35.01 | 8.71 | 59.9% | 60.0 | 1.1% | 0.86 | 991 | 891 | 1033 | 11.2 |
| nonylamine, | | | | | | | | | |
| 10–20 ppm | | | | | | | | | |
| 34.98 | 8.79 | 60.1% | 60.0 | 2.13% | 1.20 | 1378 | 1127 | 1366 | 8.13 |
| 100 ppm | | | | | | | | | |
| 35.02 | 8.71 | 59.9% | 60.0 | 2.43% | 1.27 | 1462 | 1288 | 1607 | 8.13 |
| 1,2-diaminocyclohexane, | | | | | | | | | |
| 10–40 ppm | | | | | | | | | |
| 35.01 | 8.76 | 60.1% | 57.7 | 2.07% | 1.15 | 1315 | 1134 | 1375 | 9.24 |
| 60 ppm | | | | | | | | | |
| 34.95 | 8.75 | 60.2% | 57.2 | 2.40% | 1.22 | 1395 | 1245 | 1544 | 9.59 |
| 90–110 ppm | | | | | | | | | |
| 30.02 | 10.01 | 52.6% | 46.9 | 2.16 | 1.10 | 1294 | 1555 | 2071 | 5.42 |
| 30.05 | 10.03 | 55.1% | 50.5 | 2.73% | 1.36 | 1599 | 1470 | 1922 | 6.42 |
| 34.94 | 8.72 | 52.5% | 43.3 | 0.46% | 0.35 | 406 | 1084 | 1301 | 4.72 |
| 130–140 ppm | | | | | | | | | |
| 29.99 | 10.04 | 60.2% | 59.2 | 4.09% | 1.91 | 2238 | 1424 | 1847 | 9.34 |
| 35.06 | 8.74 | 55.4% | 47.8 | 1.50 | 0.66 | 761 | 1198 | 1468 | 7.16 |

Included in Table III are data for operation at different initial solution concentrations. Although the concentration changes in the runs of Tables I and III show total concentration changes of between 0.3% and 4% it is to be appreciated that these test results are obtained from a special bench test apparatus having a limited absorber tube area for solution exposure. However, in actual typical commercial absorber apparatus, the abshow higher calculated solution subcooling while also showing increased water vapor absorption rates by increases in concentration change, increases in cooling water temperature change and absorber loads, and increases in heat transfer coefficients. Thus, the derived subcooling results are to be checked against other direct evidence of increased absorption rates.

We claim:

1. An absorption cycle cooling and/or heating system containing a working fluid consisting essentially of an aqueous solution of between about 30% and about 80% by weight, sodium hydroxide, potassium hydroxide or mixtures thereof, and an additive amount of between about 2 and about 5,000 parts per million, by weight, of a primary, secondary or tertiary aliphatic, cycloaliphatic or aromatic amine for increasing the rate of water vapor sorption of said working fluid.

2. A system of claim 1 wherein said amine is a liquid at temperatures of between about 18° C. and about 100° C.

3. A system of claim 1 wherein said aqueous solution comprises a mixture of sodium hydroxide and potassium hydroxide, and wherein sodium hydroxide is between about 40% and 60%, by weight, of said mixture.

4. A system of claim 1 wherein said amine comprises an aliphatic amine having between 6 and 12 carbon atoms.

5. A system of claim 1 wherein said amine comprises a cyclohexylamine.

6. A system of claim 1 wherein said amine comprises an aromatic amine.

7. A system of claim 6 wherein said aromatic amine has between 6 and 12 carbon atoms.

8. A system of claim 7 wherein said aromatic amine is a halogen substituted amine.

9. A system of claim 1 wherein said amine has between 6 and 12 carbon atoms.

10. A system of claim 2 wherein said amine has between 6 and 12 carbon atoms.

11. A system of claim 10 wherein said amine is a primary amine.

12. A system of claim 11 wherein said amine is aniline or a substituted aniline.

13. A system of claim 11 wherein said amine is an isomer of diaminocyclohexane.

14. A system of claim 1 wherein said amine is octylamine, nonylamine or decylamine.

15. A system of claim 1 wherein said amine comprises a diamine.

16. A system of claim 12 wherein said substituted aniline is a halogen substituted aniline.

17. A system of claim 1 wherein said working fluid contains a mixture of two or more of said amines.

18. A system of claim 1 including an absorption vessel comprising a reservoir containing said aqueous solution therein, a space above the level of said solution, and first distribution means for directing water into said space and water vapor for being absorbed by said aqueous solution for diluting said solution.

19. The system of claim 18 wherein said absorption vessel includes second distribution means for directing concentrated aqueous solution into said space, and first heat exchange means exposed in said space in contact with said water directed from said first distribution means.

20. The system of claim 19 wherein said absorption vessel includes second heat exchange means exposed in said space in contact with said concentrated aqueous solution directed from said second distribution means.

21. The system of claim 19 including a concentration vessel comprising a reservoir containing said aqueous solution therein and having means for heating said aqueous solution for vaporizing water therefrom thereby concentrating said solution in said reservoir, said system further comprising first conduit means for directing diluted solution from said absorption vessel reservoir to said concentration vessel, and including a skimmer cooperating with said first conduit means for separating said amine from said diluted solution directed to said concentration vessel and return means for directing said separated amine to said absorber reservoir.

22. The system of claim 21 including a dilute solution storage tank cooperating with said first conduit means for holding said diluted solution directed to said concentrator vessel from said absorption vessel.

23. The system of claim 22 wherein said skimmer is in said dilute solution storage tank.

24. The system of claim 21 including a second conduit means for directing concentrated solution from said concentrator vessel to said absorption vessel and a concentrated solution storage tank cooperating with said second conduit means for holding said concentrated solution.

25. The system of claim 24 including a skimmer in said concentrated solution storage tank for separating said amine from said concentrated solution therein, and return means for directing said separated amine to said absorber reservoir.

26. The system of claim 21 including vapor compression means cooperating with said concentration vessel for providing superheat for vaporizing said water from said aqueous solution therein.

27. The system of claim 21 wherein said concentration vessel includes means for cooling, condensing and collecting condensed vaporized water therein.

28. The system of claim 21 including means for supplying superheat from a vapor compression cycle apparatus for heating at least a portion of said aqueous solution.

29. The system of claim 27 including vapor compression means cooperating with said concentration vessel for providing heating for vaporizing said water from said aqueous solution therein.

30. The system of claim 29 wherein said means for cooling and condensing vaporized water comprises an evaporator.

31. The system of claim 29 wherein said vapor compression means comprises heat pump or air conditioning means for simultaneously supplying cooling and heating to said concentration vessel.

32. The system of claim 31 including means for supplying superheat from said vapor compression means for vaporizing said water.

33. An absorption thermal storage, cooling or refrigeration apparatus comprising a concentrator vessel containing an aqueous solution having at least 75% of dissolved solids consisting essentially of sodium hydroxide, potassium hydroxide or mixture thereof in which said aqueous solution is heated to desorb water therefrom to produce a concentrated absorbent solution and water vapor, an absorber vessel containing an aqueous solution comprising sodium hydroxide, potassium hydroxide, or mixtures thereof in which concentrated solution absorbs water vapor to produce a dilute absorbent solution, wherein the concentration of the dilute aqueous absorbent solution is between about 30% and about 55% of said hydroxide, said hydroxide mixtures or said dissolved solids, by weight, first conduit means for directing said dilute absorbent solution from said absorber vessel to said concentrator vessel and second conduit means for directing said concentrated absorbent solution from said concentrator vessel to said absorbent vessel, said aqueous absorption solution in said absorber vessel containing an additive amount of between about 2 and about 5,000 parts per million, by weight, of a primary, secondary or tertiary aliphatic or aromatic amine for increasing the rate of water vapor sorption.

34. An apparatus of claim 33 wherein said amine is a liquid at temperatures of between about 18° C. and about 100° C.

35. An apparatus of claim 33 wherein said aqueous solution comprises a mixture of sodium hydroxide and potassium hydroxide, and wherein sodium hydroxide is between about 40% and 60%, by weight, of said mixture.

36. An apparatus of claim 33 wherein said amine comprises an aliphatic amine having between 6 and 12 carbon atoms.

37. An apparatus of claim 33 wherein said amine comprises a cyclohexylamine.

38. An apparatus of claim 33 wherein said amine comprises an aromatic amine.

39. An apparatus of claim 33 wherein said aromatic amine has between 6 and 12 carbon atoms.

40. An apparatus of claim 39 wherein said aromatic amine is a halogen substituted amine.

41. An apparatus of claim 33 wherein said amine has between 6 and 12 carbon atoms.

42. An apparatus of claim 34 wherein said amine has between 6 and 12 carbon atoms.

43. An apparatus of claim 33 including a dilute solution storage tank cooperating with said first conduit means for holding said diluted solution directed to said concentrator vessel from said absorption vessel.

44. An apparatus of claim 43 including a skimmer in said dilute solution storage tanks for separating said amine from said solution therein.

45. An apparatus of claim 43 including a concentrated solution storage tank cooperating with said second conduit means for holding said concentrated solution therein.

46. An apparatus of claim 45 including a skimmer in said concentrated solution storage tanks for separating said amine from said solution therein.

47. An apparatus of claim 33 including means for purging noncondensible gases in either or both said concentrator vessel and said absorber vessel.

48. An apparatus of claim 33 including a vapor compressor cooperating with said concentrator vessel for heating said aqueous solution.

49. An apparatus of claim 33 including means for directing heat from hot gases of combustion to said concentrator vessel for heating said aqueous solution.

50. An apparatus of claim 33 including means for directing heat from a condenser to said concentrator vessel for heating said aqueous solution therein.

51. An apparatus of claim 43 including a heater cooperating with said dilute solution storage tank for selectively heating said solution therein.

52. An apparatus of claim 45 including a heater cooperating with said concentrated solution storage tank for selectively heating said solution therein.

53. An apparatus of claim 43 including means for selectively directing water into said dilute solution storage tank for diluting said solution therein.

54. An apparatus of claim 33 including an evaporator for condensing said water vapor.

55. An apparatus of claim 54 including a vapor compressor, condenser or hot combustion gas directing means cooperating with said concentrator vessel for heating said aqueous solution.

56. An apparatus of claim 33 including vapor compression means to provide heat for desorbing water from said aqueous solution and to provide cooling for condensing water vapor.

57. An apparatus of claim 48 including means for supplying superheat from said vapor compressor for heating said aqueous solution.

58. An apparatus of claim 56 wherein said vapor compression means comprises heat pump or air conditioning means for simultaneously supplying said heat and said cooling.

59. An apparatus of claim 33 wherein said aqueous absorption solution in said absorber vessel contains a mixture of two or more of said amines.

60. In operation of an absorption cycle cooling and/or heating system including an absorber containing an aqueous alkali metal hydroxide absorption solution for absorbing water vapor therein, a method of improving the rate of water vapor absorption in said absorption solution comprising adding thereto an additive amount of between about 2 and about 5,000 parts per million, by weight, of a primary, secondary or tertiary aliphatic, cycloaliphatic or aromatic amine.

61. A method of claim 60 wherein said amine is a liquid at temperatures of between about 10° C. and about 100° C.

62. A method claim 61 wherein said amine comprises an aliphatic amine having between 6 and 12 carbon atoms.

63. A method of claim 61 wherein said amine comprises an aromatic amine having between 6 and 12 carbon atoms.

64. A method of claim 60 wherein said aqueous solution comprises a mixture of sodium hydroxide and potassium hydroxide, wherein the amount of sodium hydroxide is between about 40% and 60%, by weight, of said mixture.

65. A method of claim 60 comprising adding two or more of said amines to said absorption solution.

66. The system of claim 1 wherein said additive amount is up to about 500 parts per million.

67. The system of claim 33 wherein said additive amount is up to about 500 parts per million.

68. The method of claim 60 comprising adding up to about 500 parts of said amine.

69. An absorption cycle cooling and/or heating system containing a working fluid consisting essentially of an aqueous solution of between about 30% and about 80% by weight, sodium hydroxide, potassium hydroxide or mixtures thereof, and at least 2 parts per million, by weight, of a primary, secondary or tertiary aliphatic amine having between 6 and 12 carbon atoms, cyclohexyl amine or aromatic amine for increasing the rate of water vapor sorption of said working fluid.

70. A system of claim 69 wherein said aqueous solution comprises a mixture of sodium hydroxide and potassium hydroxide, and wherein sodium hydroxide is between about 40% and 60%, by weight, of said mixture.

71. A system of claim 69 wherein said amine comprises a primary aliphatic amine having between 6 and 12 carbon atoms.

72. A system of claim 69 wherein said amine comprises a cyclohexylamine.

73. A system of claim 69 wherein said amine comprises an aromatic amine.

74. A system of claim 73 wherein said aromatic amine has between 6 and 12 carbon atoms.

75. A system of claim 74 wherein said aromatic amine is a halogen substituted amine.

76. A system of claim 69 wherein said amine is aniline or a substituted aniline.

77. A system of claim 69 wherein said amine is an isomer of diaminocyclohexane.

78. A system of claim 69 wherein said amine is octylamine.

79. A system of claim 69 wherein said amine is nonylamine.

80. A system of claim 69 wherein said amine is decylamine.

81. A system of claim 69 wherein said amine comprises a diamine.

82. A system of claim 76 wherein said substituted aniline is a halogen substituted aniline.

83. A system of claim 69 wherein said amine is ethylhexyl amine.

84. A system of claim 69 wherein said amine is a methyl diaminopentane.

85. A system of claim 69 wherein said amine is dimethylhexyl amine.

86. A system of claim 69 wherein said amine is dipentlyl amine.

87. A system of claim 69 wherein said working fluid contains a mixture of two or more of said amines.

88. A system of claim 69 including an absorption vessel comprising a reservoir containing said aqueous solution therein, a space above the level of said solution, and first distribution means for directing water into said space and water vapor for being absorbed by said aqueous solution for diluting said solution.

89. The system of claim 88 including a concentration vessel comprising a reservoir containing said aqueous solution therein and having means for heating said aqueous solution for vaporizing water therefrom thereby concentrating said solution in said reservoir, said system further comprising first conduit means for directing diluted solution from said absorption vessel reservoir to said concentration vessel, and including a skimmer cooperating with said first conduit means for separating said amine from said diluted solution directed to said concentration vessel and return means for directing said separated amine to said absorber reservoir.

90. An absorption thermal storage, cooling or refrigeration apparatus comprising
a concentrator vessel containing an aqueous solution having at least 75% of dissolved solids consisting essentially of sodium hydroxide, potassium hydroxide or mixtures thereof in which said aqueous solution is heated to desorb water therefrom to produce a concentrated absorbent solution and water vapor,
an absorber vessel containing an aqueous solution comprising sodium hydroxide, potassium hydroxide, or mixtures thereof in which concentrated solution absorbs water vapor to produce a dilute absorbent solution, wherein the concentration of the dilute aqueous absorbent solution is between about 30% and about 55% of said hydroxide, said hydroxide mixtures or said dissolved solids, by weight,
first conduit means for directing said dilute absorbent solution from said absorber vessel to said concentrator vessel and second conduit means for directing said concentrated absorbent solution from said concentrator vessel to said absorbent vessel,
said aqueous absorption solution in said absorber vessel containing at least 2 parts per million, by weight, of a primary, secondary or tertiary aliphatic amine having between 6 and 12 carbon atoms, cyclohexyl amine or aromatic amine for increasing the rate of water vapor sorption.

91. An apparatus of claim 90 wherein said aqueous solution comprises a mixture of sodium hydroxide and potassium hydroxide, and wherein sodium hydroxide is between about 40% and 60%, by weight, of said mixture.

92. An apparatus of claim 90 wherein said amine comprises an aliphatic amine having between 6 and 12 carbon atoms.

93. An apparatus of claim 90 wherein said amine comprises a cyclohexylamine.

94. An apparatus of claim 90 wherein said amine comprises an aromatic amine.

95. An apparatus of claim 90 wherein said aromatic amine has between 6 and 12 carbon atoms.

96. An apparatus of claim 95 wherein said aromatic amine is a halogen substituted amine.

97. An apparatus of claim 90 wherein said amine is octylamine.

98. An apparatus of claim 90 wherein said amine is nonylamine.

99. An apparatus of claim 90 wherein said amine is decylamine.

100. An apparatus of claim 90 wherein said amine is ethylhexyl amine.

101. An apparatus of claim 90 wherein said amine is a methyl diaminopentane.

102. An apparatus of claim 90 wherein said amine is dimethylhexyl amine.

103. An apparatus of claim 90 wherein said amine is dipentlyl amine.

104. In operation of an absorption cycle cooling and-/or heating system including an absorber containing an aqueous alkali metal hydroxide absorption solution for absorbing water vapor therein, a method of improving the rate of water vapor absorption in said absorption solution comprising adding thereto at least 2 parts per million, by weight, of a primary, secondary or tertiary aliphatic amine having between 6 and 12 carbon atoms, cyclohexyl or aromatic amine.

105. A method of claim 104 wherein said amine is a liquid at temperatures of between about 18° C. and about 100° C.

106. A method claim 100 wherein said amine comprises an aliphatic amine having between 6 and 12 carbon atoms.

107. A method of claim 104 wherein said amine comprises an aromatic amine having between 6 and 12 carbon atoms.

108. A method of claim 104 wherein said aqueous solution comprises a mixture of sodium hydroxide and potassium hydroxide, wherein the amount of sodium hydroxide is between about 40% and 60%, by weight, of said mixture.

109. A method of claim 104 comprising adding two or more amines to said absorption solution.

110. A method of claim 104 wherein said amine comprises a cyclohexylamine.

111. A method of claim 107 wherein said aromatic amine is a halogen substituted amine.

112. A method of claim 104 wherein said amine is octylamine, nonylamine or decylamine.

113. A method of claim 104 wherein said amine is ethylhexyl amine.

114. A method of claim 104 wherein said amine is a methyl diaminopentane.

115. A method of claim 104 wherein said amine is dimethylhexyl amine.

116. A method of claim 104 wherein said amine is dipentlyl amine.

* * * * *